United States Patent [19]

Walraven

[11] Patent Number: 4,974,504

[45] Date of Patent: Dec. 4, 1990

[54] APPARATUS FOR THE CONTINUOUS PROCESSING OF DEAD ANIMAL MATERIAL, SUCH AS OFFAL

[75] Inventor: Oscar E. D. Walraven, Boxmeer, Netherlands

[73] Assignee: Stork Duke B.V., Boxmeer, Netherlands

[21] Appl. No.: 336,885

[22] Filed: Apr. 12, 1989

[30] Foreign Application Priority Data

Apr. 13, 1988 [NL] Netherlands .............. 8800960

[51] Int. Cl.$^5$ .............................................. A23L 3/00
[52] U.S. Cl. ........................................ 99/483; 99/472; 99/478; 99/484
[58] Field of Search ................. 99/453, 451, 467, 468, 99/470, 483, 484, 485, 510, 516, 534; 241/65, 101.5, 23, 17; 426/480, 641, 807

[56] References Cited

U.S. PATENT DOCUMENTS

| | | | |
|---|---|---|---|
| 2,143,346 | 1/1939 | Frederickson | 99/483 X |
| 3,412,671 | 11/1968 | Merlis | 99/483 |
| 3,955,489 | 5/1976 | Goerling et al. | 99/485 |
| 4,219,586 | 8/1980 | Parks, Jr. | 99/527 X |
| 4,583,453 | 4/1986 | Torterotot | 99/453 |
| 4,593,614 | 6/1986 | Berge et al. | 426/480 |
| 4,667,590 | 5/1987 | Balaam et al. | 99/470 |

FOREIGN PATENT DOCUMENTS 0134732 3/1979 Fed. Rep. of Germany ........ 99/483

Primary Examiner—Timothy F. Simone
Attorney, Agent, or Firm—Hurt, Richardson, Garner, Todd & Cadenhead

[57] ABSTRACT

Dead animal material, such as offal, is in subsequent steps and in a continuous manner comminuted in a comminuter, pumped to a pre-heating/sterilization installation by a pump, heated to the sterilization temperature in a number of successive tubular heat exchangers and, for some time, kept at the sterilization temperature in a long tube, reduced in pressure in a sluice system fed through a cyclone and finally further processed to the desired end product. The heat exchangers and the tube are connected to one another to a long closed tube through which the material flows in a plug flow. Vapors set free in the cyclone are used for the first pre-heating of the material.

12 Claims, 1 Drawing Sheet

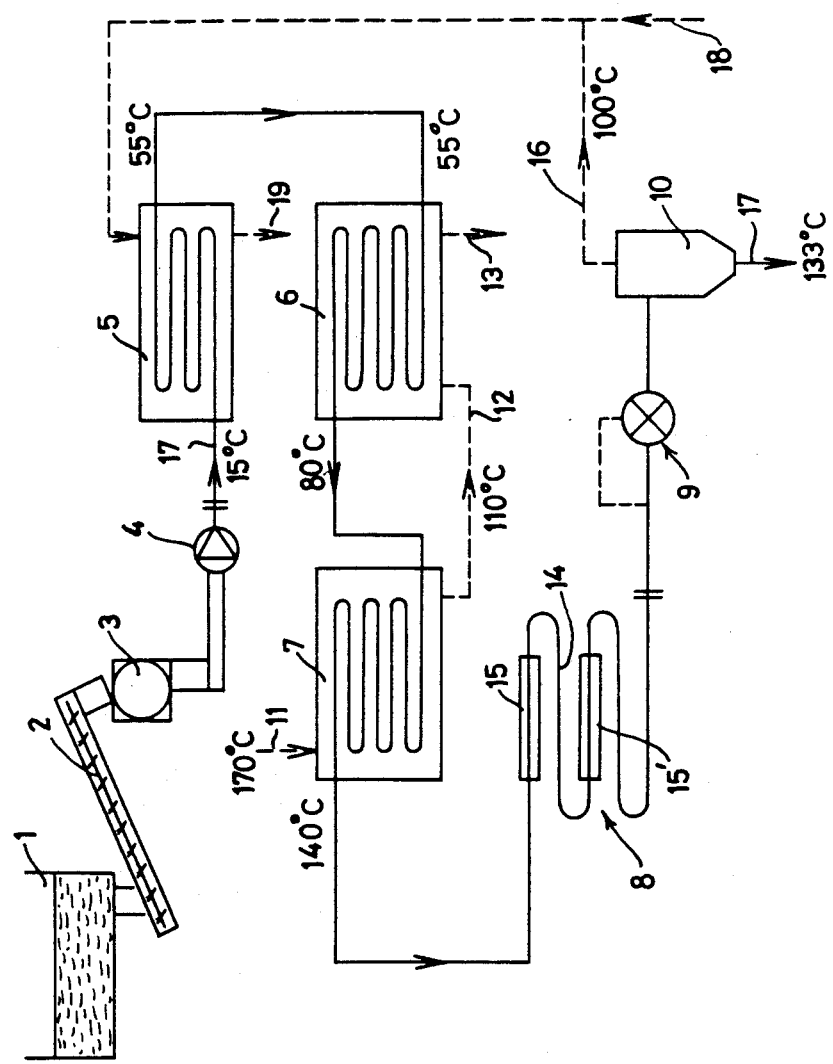

APPARATUS FOR THE CONTINUOUS PROCESSING OF DEAD ANIMAL MATERIAL, SUCH AS OFFAL

BACKGROUND OF THE INVENTION

The invention relates to a method and apparatus for the processing of dead animal material, such as offal.

Dead animal material, such as entrails and bones with residues of organic material, for example from slaughterhouses, but also complete carcasses are converted in an offal processing installation into, in the main, fat and meat bonemeal. The offal largely consists of water. The bulk of this has to be removed. In addition, the requirement is that the dead animal material is subjected to a sterilization treatment.

In general, an apparatus for the processing of offal comprises a first section in which the offal is preboiled and the mixture formed is then sterilized. The mixture pre-treated in this way is then fed to a second section in which the major portion of the water is evaporated. The fat and meat bonemeal are then separated off.

In the past, it was customery to carry out the first part of the processing process batch-wise.

However, there is a tendency also to carry out this first part of the offal processing process continuously and a screw press then provide for the separation into fat and solid substances.

However, this known system has the following disadvantages.

The sterilization takes place in a holding vessel. The residence time of the various particles of the material present in the vessel is thus different for each of the particles and not controllable. This means that in order to ensure that every particle obtains the required sterilization treatment, the mean residence time of the particles in the vessel is greater than the residence time required for one particle. In order to obtain a good sterilization, a particle must be kept at a temperature of 133° C. for 20 minutes.

Furthermore, the system has the disadvantage that two pumps are needed to transport the material through the pre-drier and the sterilizer.

In order to obtain a readily pumpable substance, 1 kg of fat has to be supplied per 1 kg of offal and intermediate storage vessels provided with stirrer devices have to be used. As a result of the recirculation of the fat and as a consequence of the long storage time at high temperature, the content of free fatty acids in the fat will rise, which leads to an impairment in quality.

A further disadvantage is that during pre-drying, in which use is made of electrically/mechanically compressed waste vapours, the required heat transfer can be achieved only if the pumpable material contains very fine particles. The consequence of this is that the material is difficult to press, because of the lack of structure, on pressing at the end of the process. Moreover, a great deal of electrical energy is needed for the mechanical compression and for the fine comminution. With the known system the waste vapours emerging from the pre-boiler have reached a temperature of only about 125° C. and then also have to be post-sterilized in an installation; this is also to be regarded as a disadvantage.

SUMMARY OF THE INVENTION

The aim of the invention is to overcome the above-mentioned disadvantages. This aim is achieved by a method for the processing of dead animal material, such as offal, with which the material is comminuted in a continuous process, the comminuted material is heated to the sterilization temperature and is kept at the sterilization temperature for some time, after which the pressure on the sterilized material is reduced and the material is further processed to the desired end product, which method is characterized in that the dead animal material is fed directly after comminuting to a pre-heating/sterilization system consisting of a long closed tube through which the comminuted material is transported in a plug flow and in which the material is preheated in a number of successive steps to the sterilization temperature and is then kept at the sterilization temperature for some time.

For carrying out the abovementioned method, the invention also provides an apparatus for the processing of dead animal material, such as offal, comprising means for comminuting the material, a pre-heating/sterilization installation for heating and sterilizing the comminuted material, means for transporting the material, means for lowering the pressure on the sterilized material and means for the further processing of the sterilized material to the desired end product, which apparatus is characterized in that the pre-heating/sterilization installation consists at least of a number of tubular heat exchangers connected to one another, in which the material can be brought to the sterilization temperature in a number of seccessive steps, and a tube, connected to these tubular heat exchangers, in which the material can be kept at the sterilization temperature, and in that only the means for transporting the material are located between the pre-heating/sterilization installation and the means for comminuting the material.

By means of the method and apparatus according to the invention it is possible to process dead animal material, such as offal, in a continuous process with which the sterilization, and in particular the time for which the material is kept at the sterilization temperature, can be very well controlled. Moreover, the material needs to be comminuted to only a relatively slight extent before feeding to the pre-heating/sterilization installation. Furthermore, the apparatus can be simpler than the known apparatus as only one pump is needed for the transport of the material to be processed and intermediate storage vessels can be dispensed with.

Preferred embodiments of the method and apparatus according to the invention are specified in the subsidiary claims.

The invention will hereafter be illustrated in more detail by means of the description of an embodiment example with reference to the appended drawing.

BRIEF DESCRIPTION OF THE DRAWING

The single drawing shows schematically the first part of an apparatus according to the invention.

DETAILED DESCRIPTION OF A PREFEREED EMBODIMENT

The part of the apparatus according to the invention shown in the drawing comprised the following components: a storage vessel 1 for the raw material, a transport installation 2, a comminuter 3, a pump 4, a first heat exchanger 5, a second heat exchanger 6, a third heat exchanger 7, a sterilizer 8, a sluice system 9 and a cyclone 10. When offal is processed in the apparatus, the offal is fed from the storage vessel 1 and via the transport installation 2 to a known comminuter which comminuted the offal to particles with a maximum dimension of about 3 cm. The comminuted material is then fed with the aid of a pump 4 to a pre-heating/sterilization system which consists of a long, closed, stainless-steel tube through which the mixture flows in a plug flow. This tube is part of the heat exchangers 5, 6 and 7 and the sterilizer 8. It is important that a good pump is used which is capable of feeding the material through the pre-heating/sterilization system under a sufficiently high pressure and at the correct throughput.

In the first heat exchanger 5, the material is heated from a temperature of about 15° C. to a temperature of about 55° C. In the second heat exchanger the material is heated from about 55° C. to about 80° C. and in the third heat exchanger from about 80° C. to about 140° C., which is somewhat above the required sterilization temperature.

The final heat exchanger 7 is heated by steam under a pressure of at most 10 bar, which is fed in at 11, by which means it is ensured that the material to be processed reaches a temperature of 140° C. In order to prevent the material baking onto the tube wall in the heat exchanger 7, it can be necessary to stir the material in the heat exchanger 7 with an agitator. In this case, the tube must have a diameter such that an agitator can rotate therein.

The second heat exchanger 6 is heated by the steam condensate originating from the heat exchanger 7 (via line 12) and from the drier in the second part of the installation. The condensate is drawn off at 13, from where it is recycled to the boiler.

The first heat exchanger 5 is heated by using the vapours set free (via line 16) from the cyclone 10, which will be described in more detail below, and from the drier in the second part of the apparatus, which vapours are fed in at 18. The vapour condensate is removed at 19.

Depending on the quantity of available waste vapours, the heat exchangers 5 and 6 can be combined to form a single heat exchanger heated by using vapor set free from the cyclone 10 and from the dryer in the second part of the apparatus and heating to 80° using steam condensate from the third heat exchanger 7 is dispensed with.

The pre-heated material, which leaves the third heat exchanger 7 at a temperature of 140° C., is fed to the sterilizer 8, which consists of a relatively long tube 14. This tube is provided with a good heat-insulating jacket. If desired, a section 15, 15' of the tube can be designed as a heat exchanger heated by steam, so that local additional heating of the material flowing through is possible.

By the correct choice of the length and the diameter of the tube and control of the throughput speed and the inlet and outlet temperature of the material, it can be ensured that the material is sterilized in such a way that the specified sterilization requirements, for example the requirement that the material is kept at 133° C. for 20 minutes, are met.

It is also possible to heat the material in the installation wholly or partly by the direct injection of steam or vapour into the material. If this is done in the sterilizer, the injected steam must, of course, be sterile.

Downstream of the sterilizer 8, the material under pressure is fed via a sluice system 9 provided with a pressure regulator to a cyclone 10, in which the material is "flashed down" to a temperature of about 100° C. During this operation a quantity of vapour is released which is fed via line 16 to the first heat exchanger 5. Under the above operating conditions, approximately 10% of the water present in the material will vaporize in the cyclone. Heating of the heat exchanger 5 with the vapours originating from the cyclone contributes to an achievable energy saving of 113 kg of steam on the total 210 kg of steam necessary for heating and sterilizing one tonne of material. The total electrical energy to be supplied is about 16.5 kWh per ton of material. It is noted that the vapours emerging from the cyclone 10 are sterilized and that the vapour condensate removed at 19 is also sterile.

From the cyclone 10, the material is fed, at 17, for further processing (drying and separating into fat and meat bonemeal) to the second part of the apparatus not shown here and known per se.

A modified two-cylinder section pump with hydraulic drive is very suitable as the pump 4. A pump of this type is known per se. It is important in this connection that the material to be pumped is fed to the pump cylinders by means of a screw feed.

The heat exchangers 5, 6 and 7 are preferably designed as tubular heat exchangers, the tube through which the material flows being incorporated in a larger vessel. Heat exchangers of this type are also referred to a "shell and tube" heat exchangers.

The sluice system 9 can be designed with ball valves which are controlled pneumatically or hydraulically, such that the correct pressure is maintained in the system located upstream. The sluice system 9 also contains a measurement and control system in order to maintain the desired system pressure, capacity and temperature.

The sluice system 9 can also be designed with so-called swivel tubes. A swivel tube consists of a curved tube section, of which the two end portions are parallel to one another and which is rotatable about an axis coincident with the centre line of one of the end portions.

The end portion of the rotatable tube section of which the centre line coincides with the axis of rotation is in general connected to a tube in a rotatable manner.

The other end portion of the tube section, which can be swivelled about the axis of rotation, connects sealingly with a plate provided with a hole, the so-called rest plate. This end of the tube section can move over the plate during the rotation of the tube section and be positioned opposite the hole in the plate or opposite a closed section of the plate, by which means a passage is or is not produced and transport through the swivel tube thus can or cannot take place.

In a specific embodiment of the installation according to the invention which is suitable for the processing of 10 ton of offal per hour, the tube through which the material is transported has a diameter of 150 mm in the pre-heating section and a diameter of about 300 mm in the sterilizer 8. A diameter which varies over the length of the sterilization tube can be chosen, such that the material is kept in a homogeneous condition. This is particularly important in horizontal sections. The heating surface of the first, 5, the second, 6, and third, 7, heat exchanger is 65, 65 and 75 m$^2$ respectively. The length of the tube in the sterilizer 8 is 70 m. The pressure of the material to be processed is approximately 25 to 30 bar at the inlet to the first heat exchanger at 17, and the pressure downstream of the sluice system 9 is about 3½ bar, in order to prevent evaporation in the system and the maintain the temperature at a minimum of 133° C. The different temperatures of the material to be processed are indicated in the drawing.

The pump 4 has a maximum capacity of 15 m³/hour under a compressive pressure of 40 bar. The transport cylinders have a diameter of 110 mm and the piston stroke length is 1000 mm.

What is claimed is:

1. An apparatus for the processing of flowable and viscous dead animal material, such as offal, to a desired end product, comprising in succession:
   means for comminuting the dead animal material;
   means for transporting the dead animal material through the apparatus;
   a heating and sterilizing installation for heating and sterilizing the comminuted dead animal material, the preheating and sterilizing installation having a substantially uniform internal cross-section to maintain a uniform plug flow, the preheating and sterilizing installation having at least a first and a last tubular heat exchanger and a tube, the tubular heat exchangers being connected one to another, the tubular heat exchangers bringing the dead animal material to an elevated sterilizing temperature in a number of successive steps, the tube connecting to the last tubular heat exchanger and keeping the dead animal material at the elevated sterilizing temperature for some time;
   means for lowering the pressure on the dead animal material; and
   means for further processing the dead animal material to the desired end product.

2. The apparatus of claim 1, further comprising:
   a sluice system located downstream from the preheating and sterilizing installation; and
   a cyclone located directly downstream of the sluice system and connecting to the first tubular heat exchanger, the cyclone setting free vapors and the first tubular heat exchanger using the vapors as a heating medium.

3. The apparatus of claim 1, further comprising a steam supply connecting to the last tubular heat exchanger.

4. The apparatus of claim 1, wherein the last tubular heat exchanger includes devices for agitating the dead animal material flowing through the last tubular heat exchanger.

5. The apparatus of claim 1, further comprising an insulating jacket for keeping the dead animal material at the sterilizing temperature, the insulating jacket covering at least a portion of the tube.

6. The apparatus of claim 1, wherein the tube further consists of a heat exchanger adapted to be heated by steam.

7. The apparatus of claim 1, wherein the means for transporting the dead animal material further comprises a pump for pumping the dead animal material.

8. The apparatus of claim 1, wherein the sluice system further comprises a measurement and regulating system having ball valves or swivel tubes.

9. The apparatus of claim 1, wherein a sluice system is located downstream of the preheating sterilization installation and wherein a cyclone is located directly downstream of the sluice system which cyclone comprises means for introducing the vapors emerging from the cyclone to said first said heat exchanger said vapors to be used as the heating medium in said first heat exchanger.

10. The apparatus of claim 1, wherein the means for transporting the material includes a pump for pumping discus dead animal material.

11. The apparatus of claim 10, wherein said pump is a modified two cylinder piston pump with hydraulic drive.

12. The apparatus of claim 2, wherein the sluice system further comprises ball valves or swivel tubes and a measurement and regulating system.

* * * * *